Oct. 2, 1923.

O. GARRISON

GEAR GRINDING MACHINE

Filed Aug. 12, 1921

INVENTOR
ATTORNEY

Oct. 2, 1923.

O. GARRISON

GEAR GRINDING MACHINE

Filed Aug. 12, 1921

Patented Oct. 2, 1923.

1,469,504

UNITED STATES PATENT OFFICE.

ORLANDO GARRISON, OF DAYTON, OHIO.

GEAR-GRINDING MACHINE.

Application filed August 12, 1921. Serial No. 491,653.

*To all whom it may concern:*

Be it known that I, ORLANDO GARRISON, a citizen of the United States, residing in Dayton, in the county of Montgomery and State of Ohio, have invented certain new and useful Improvements in Gear-Grinding Machines, of which the following is a specification, reference being had therein to the accompanying drawings.

This invention relates to a machine for grinding the teeth of gears, the invention being a further development and improvement of the gear-grinding machine which forms the subject matter of United States Patent No. 1,366,284, issued to me as co-inventor and assignee, January 18, 1921.

As set forth in the patent referred to, the teeth of open gears are generated, in the practice of the invention described therein, by grinding the same with an emery wheel or other suitable disc grinder having its work edge dressed to the pressure angle of the tooth to be generated. The work contact surface of the grinding wheel, being generated from a rack, gears ground on the machine, when in mesh one with another, will have substantially the same true working mesh and action that a perfect gear and a perfect rack would have if worked one with the other.

To accomplish this both sides of each tooth of the gear are uniformly ground by successive operations,—each tooth being generated to conform with a tooth of a master gear and thus having the required accuracy to effect practically the theoretical rolling contact of a spur gear with a rack.

As in the earlier invention of record above referred to, in the practice of the present invention, the work edge of the grinding disc and the teeth of a gear being ground sustain the same pressure angle relations one with the other as a master rack and gear if worked one with the other,— the grinding of each tooth being effected by intermittent operations,—the grinding effected on each tooth at one operation being of slight degree and only on a small portion of the working surface of the tooth, all the teeth being ground to like extent before further operation takes place on a given tooth. Thus all the teeth of a gear are in process of grinding at one time; all receive the same number and same degree of grinding operations, and all are brought to the accuracy, substantially, of a perfect gear.

The intermittent grinding of the teeth is of great importance in this art as the heat generated in the gear as a result of the grinding friction is so slight that it has no measurable effect on the accuracy of the gear teeth. Thus gears ground in production practice with my invention can be ground rapidly, have the uniform accuracy of master gears, and can be produced at relatively lower cost than unground gears by present standard practice.

The present invention provides means, applied in novel relation to the grinding disc carrying mechanism, for dressing the work edge of the disc to the exact shape and dimensions required for the gears to be ground; improved means for aligning the gears to be ground with the master gear in setting up the work; improved means for indexing the work for the progressive grinding operations and for cross-stepping the work for repeat operations; improved means for adjusting the disc to the work, and for automatically and manually controlling the general operation of the machine as a whole, —various additional novel features being incorporated in the invention as illustrated in the accompanying drawings and set forth and described in the detail specification.

As here shown the grinder is supported on a machine base —B which rests on a suitable pedestal base —A. The grinding disc is carried on a grinder head —C and the work is supported on a work head —D, the wheel dresser —E being mounted on base —B intermediate the grinder head and work head. These several units constitute the main divisions of the machine and will each be described separately as to detail construction before describing their coordinated relations.

The machine base.

The machine base consists of the housing —B which is enlarged at its rear portion to receive and support the main operating mechanism of the machine, consisting of a shaft —1 which is mounted in suitable bearings on one side of the housing and has secured to its outer end a pulley —2 which is connected by a belt —3 to a pulley —4 on drive shaft —5 mounted in bearings —6 on the rear end of the machine base, the opposite end of the drive shaft having a cone pulley —7 secured thereto and connected to the counter shafting by means of a belt —8, whereby operating power can be transmitted to the machine as a whole at different speeds as may be required by the variable conditions of the work. A clutch member —9 is mounted on shaft —5 and connected with pulley —7 for controlling the driving mechanism of the machine. The clutch connections between member —9 and pulley —7 may be of any suitable construction. As used in the present invention, shaft —5 is hollow, and connection is made internally between member —9 and an internal friction clutch in cone pulley —7, no novelty being claimed as to the detail construction which is not shown.

Inside housing —B a bevel gear —10 is mounted on shaft —1 and meshes with a bevel gear —11 mounted on a vertical shaft —12 which has upper and lower bearings —13 supported between the walls of the housing. Secured to the upper end of shaft —12 is a crank or pitman arm —14 by means of which operating movement is imparted to the grinder head through a pitman —15 and pitman wrist-pin connections —16 and 17.

Formed integrally with gear —11 on the under side thereof, as here shown, is a reduced bevel gear —18 which meshes with a gear —19 secured to the inner end of a divided shaft, the sections —20 and —21 of which are joined one to the other by a clutch coupling, which may be of any suitable construction. As here shown the coupling consists of a long telescopic sleeve —22 which is pinned at one end to shaft —21, and a short sleeve —23 secured in any suitable manner to shaft —20 which extends through the sleeve and has its free end extending into sleeve —22. Sleeve —22 has a longitudinal aperture formed therein to receive a clutch bolt —24 which is butted against a spring —24ª at its inner end and projects beyond the sleeve at its opposite end and has operative relation with clutch member —23 by means of a clutch socket —23ª. Sleeve —22 has an annular groove —22ª formed therein and clutch pin —24 has a groove —24ᵇ formed therein which is adapted to be moved into and out of operative relation with clutch member —23 by a clutch lever —24ᶜ as will presently be described. Secured to the outer end of shaft —21 are cams 50 and 50ª by means of which operating movement is transmitted to the work-head of the machine.

The grinding-head.

The grinding-head —C is mounted on a block —25 secured to the head of a ram —26, which is operable in longitudinal ways —27 on the machine base —B, operating movement being imparted to the ram through the pitman connection —14, —15. The grinder-head mounting block, —25 is adjustable vertically on the ram by means of opposite vertical slots —28 in the ram-head and set screws —29 in the block, and the grinder-head is adjustable on the mounting block by means of vertical ways —30 and a screw shaft —31 of the usual construction and having a handle —32 and graduated dial —33 mounted on block —25 by means of which accurate vertical adjustments can be made of the grinder-head.

The grinder disc —34 is mounted on a head-shaft —35 supported in adjustable bearings —36, a pulley —37 being secured to a projecting end of the shaft and connected by a belt —38 to a pulley —39 secured to a shaft —40 which is mounted in longitudinally adjustable bearings —41 on the rear end of the ram, the opposite end of shaft 40—having a cone pulley —42 secured thereto and connected to the counter shafting by a belt —43 by means of which operating power can be transmitted to the grinder wheel at different speeds as may be required for grinder wheels of different diameters and for different conditions in the work.

The work-head.

The work-head —D of the machine is supported on the base —B by a bed block —51, the mechanism as a whole being mounted on the block by means of a bed plate —51ª operable in ways 51ᵇ, the bed mechanism as a whole being constructed according to the best known practice for effective lubrication of the ways and the exclusion of grit therefrom,—the bed plate and work-head mounted thereon being operable transversely of the machine to cross-step the work to the grinder disc.

The work is here shown as consisting of two spur gears —52 which together with a master gear —53, are mounted in any suitable manner on an arbor or spindle —54, the spindle being supported in a split-sleeve, adjustable bearing —55. A collar —56 formed integrally with the spindle, or secured thereto in any suitable manner, serves as a stop for the spindle in one direction against bearing —55, a collar —57 and spindle adjusting nut —58 being applied to the spindle at the opposite end of the bearing to effect longitudinal adjustment of the spindle therein. The outer end of the spindle is tapered as shown at —59 to form a suitable support for the master gear the bore of which is tapered to fit the taper of the spindle,—the master gear being locked on the spindle by means of a nut —60, certain parts intermediate the nut and gear being later described. The opposite end of the spindle is internally threaded, and the work gears —52 are secured thereon by means of a head screw —61, lock washer —62 being interposed between screw —61 and gears —52, as here shown, to hold the work securely on the spindle, the gears —52 on the opposite side being forced against collar 56.

In setting up the work preliminary to a grinding operation it is essential, of course, that the work—in the present illustration the gears —52—is in exact alignment with the master gear, this being accomplished in the costruction here shown, before head screw —61 on the work spindle is tightened, by an adjustable one-tooth aligning bar —66, the bar being slidably mounted in a pivoted head —67 and adapted to be projected into engagement with the gears —52, and thus to align the gears with the master gear, by a lever —68, any suitable operating connection being made between the lever and bar for operating the bar,—the means here shown in dotted outline consisting of a slot —69 in the bar and a disc —70 secured to stem —71 and having a pin —70ᵃ operable in the slot. The head —67 is pivotally mounted as at —76ᵃ on a bracket —72 and is adapted to be adjusted pivotally at any angle relative to the grinder wheel, thus by the double adjustment described the bar —66 is adapted to align gears of different diameters. Head —67 has a projection —73 which extends downwardly beyond pivot center —76ᵃ over a slot —74 in bracket —72 a lock bolt —75 being used in the slot to secure one part to the other to lock the aligning head in different positions of adjustment. Thus it will be apparent that the aligning mechanism as here shown and described, will be effective in positively aligning the work with the master gear. After the work is aligned with the master gear the grinder disc is adjusted to the work by means of screw handle —32 and dial —33.

It is understood, of course, that the aligning bar is moved out of engagement with the work before grinding of the gears is started.

*Adjustment of the work to the grinder disc.*

Two movements of the work take place in the grinding operation, namely; the work is rotated step by step to bring the gear teeth successively into grinding relation with the grinder disc, the work being rotated one tooth upon each full stroke of the grinder head, a full rotation of the gears taking place between successive grinding operations on any given gear tooth; and the work is moved step by step transversely of the machine to cause each gear tooth of the work being ground to pass through mesh with the grinder disc in the same relation as a gear tooth passing through mesh with a master rack tooth if worked one with the other, thus to effect equal grinding, on any given vertical adjustment of the grinder disc, over the entire work surface of each gear tooth, the work-head being cross-stepped, or moved laterally relative to the grinder disc, one step for each full rotation of the master gear and work gears,—these operations, both as to rotation and cross-stepping of the work gears, being repeated upon each vertical adjustment of the grinder disc until the work has been brought to completion.

*Indexing the work.*

Figures 1, 5:
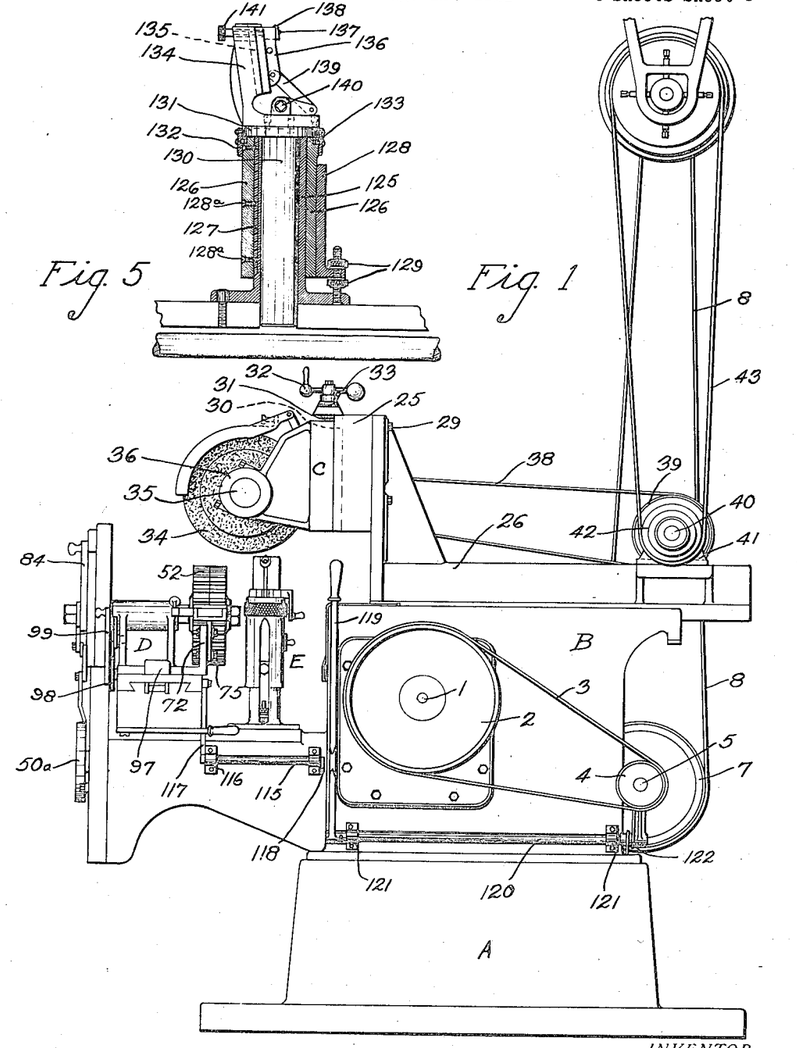
Fig. 1 is a side elevation of a gear grinding machine embodying my invention.
Fig. 5 is a vertical sectional view of the grinder disc dresser.
Figures 2, 6, 7:
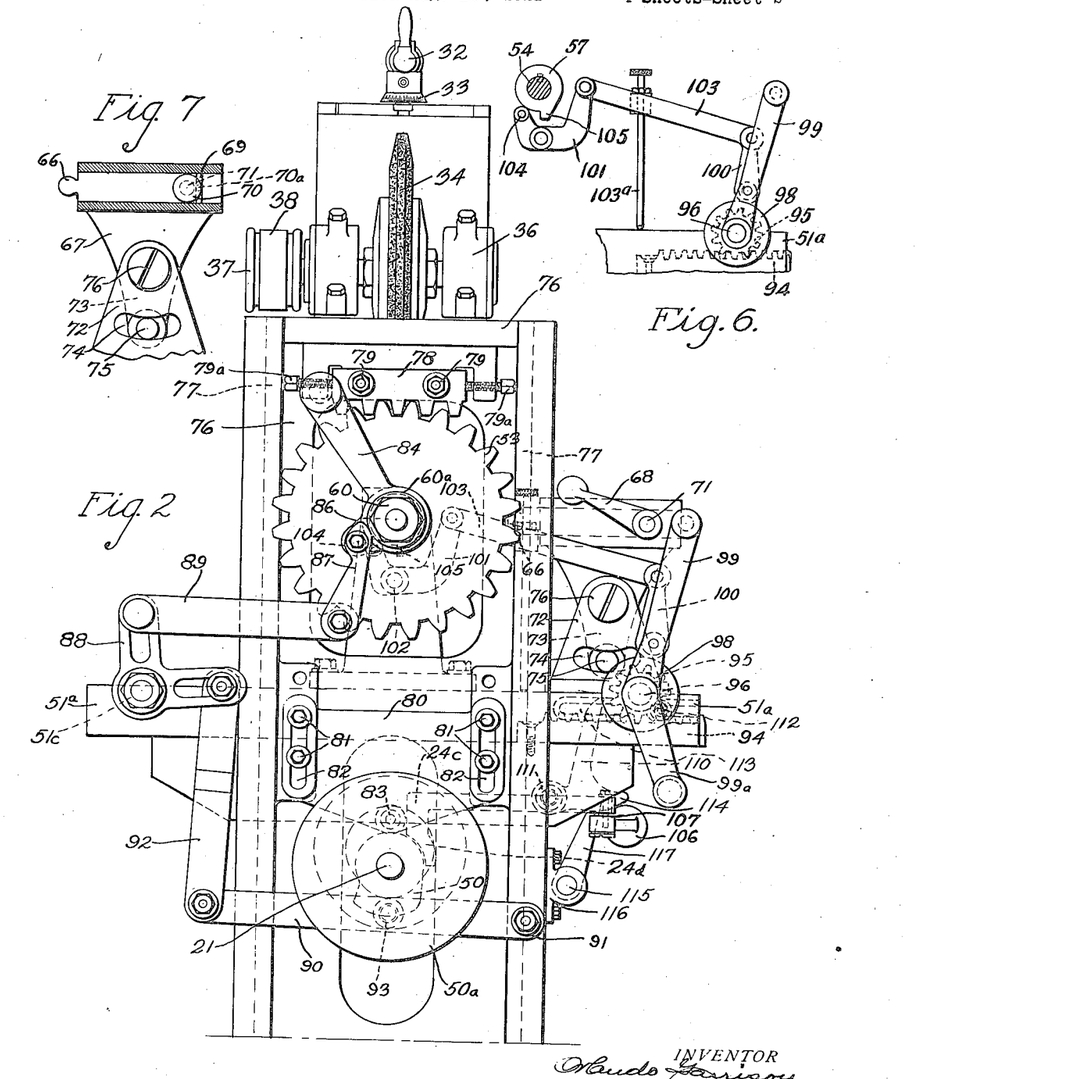
Fig. 2 is a front elevation of the machine ilustrated in Fig. 1.
Fig. 6 is a detail view of the cross-feed mechanism.
Fig. 7 is a detail view of the work aligning mechanism.
Figures 3, 8:
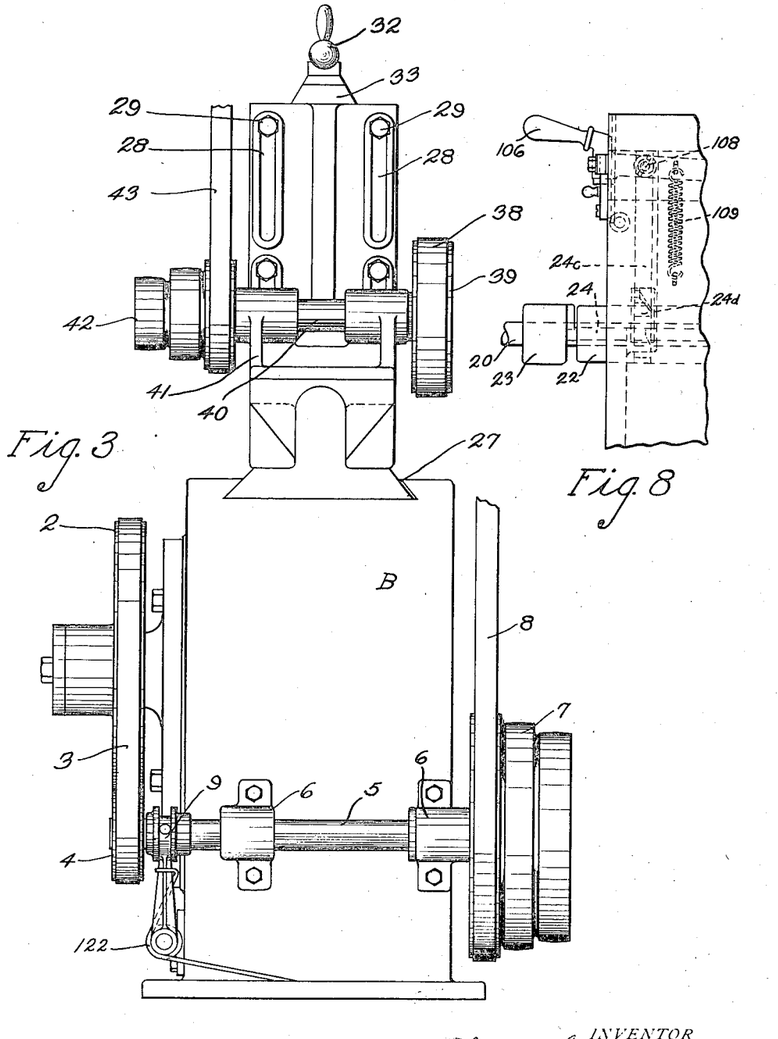
Fig. 3 is a rear elevation of the machine.
Fig. 8 is a detail view of the cross-feed controlling mechanism.
Figure 4:
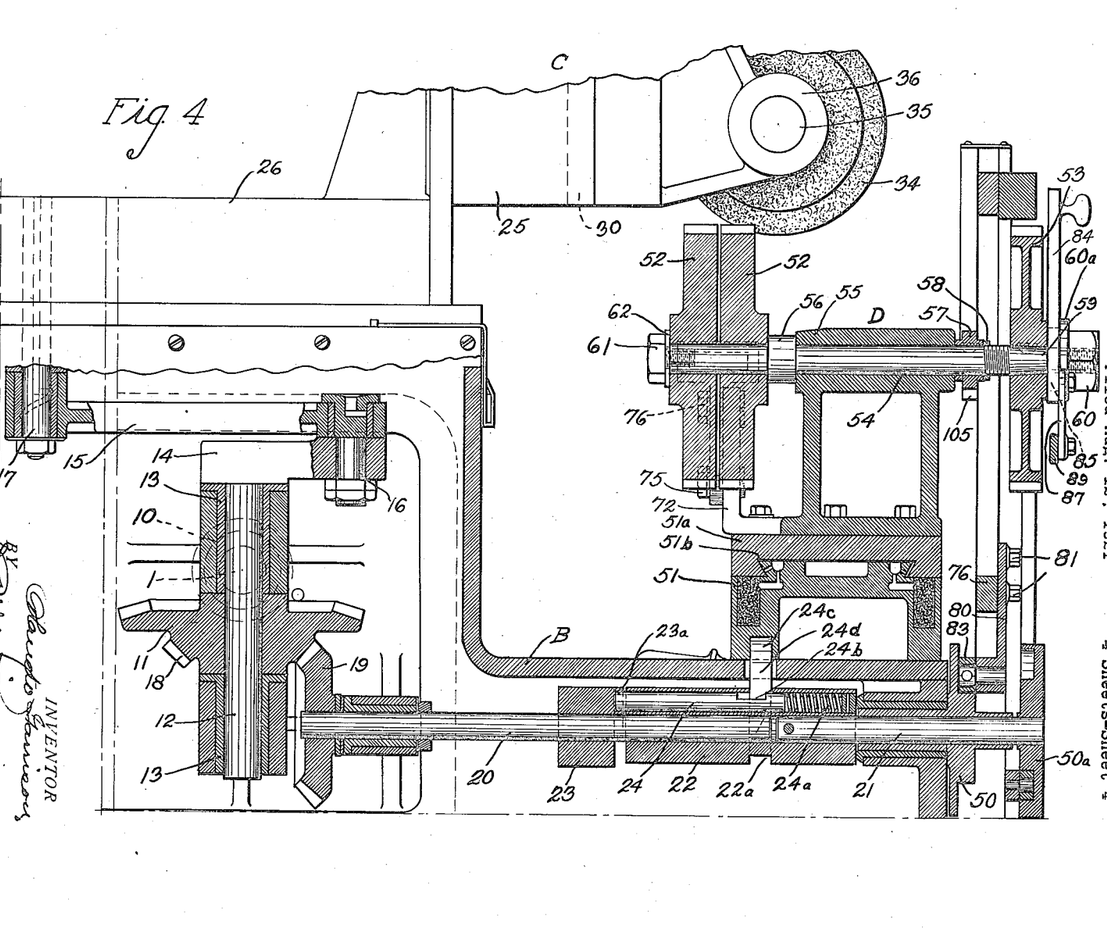
Fig. 4 is a detail, longitudinal, vertical sectional view taken substantially through the center of the machine.

The indexing mechanism consists of a vertically operable frame —76 mounted to slide in vertical ways —77 and having a master rack —78 secured thereto adjacent its upper end and adjusted to mesh accurately with the master gear —53, the frame and master rack constituting a shot-bolt for aligning the master gear, as ilustrated in Fig. 2 of the drawings, provision being made to adjust the master rack relative to the master gear and the grinding disc by means of rack mounting bolts —79 which extend through apertures in the rack substantially larger in diameter than the diameter of the bolts, thus providing for lateral adjustment of the rack relative to frame —76 in either direction, the adjustment being made by means of set screws —79ᵃ. When the rack is adjusted to the master gear one of the rack teeth will be in accurate longitudinal alignment with the grinding disc.

Frame —76 has secured to the lower end thereof a vertically adjustable base plate —80 which is secured to the frame by means of bolts —81 extending through vertical slots —82 in the base plate, provision being thus made for adjusting frame —76 and the master rack —78 vertically relative to the master gear to adapt the mechanism to master gears of different diameters.

Secured in the lower portion of base plate

—80 is a roller —83 which serves to connect the plate operatively to cam —50 on shaft —21. Thus upon each full turn of the shaft frame —76 is raised and lowered and the master rack is moved first out of engagement and again into engagement with the master gear, the gear being rotated one tooth during the interval of disengagement.

Step by step rotation of the master gear and the work aligned therewith is accomplished in connection with the operation of frame —76 by means of indexing mechanism consisting of a friction ratchet comprising a hand lever —84 mounted to rotate freely on an outwardly extended hub —85 of the master gear, and having a radial extension —86 on which is pivoted a friction pawl —87 cooperating with the periphery of a flange —60ª of the work spindle lock nut —60, the pawl being adapted to actuate the spindle in one direction and to ride idly over the periphery of flange —60ª in the opposite direction. The opposite end of pawl —87 is connected to one arm of a bell-crank lever —88 mounted on a bracket —51ᶜ of bed-plate —51ª, by a link —89, the opposite arm of lever —88 being connected to a reciprocating lever —90 pivoted on the frame of the machine as at 91, by a link —92, and lever —90 being connected to cam —50ª by means of a roller —93. Thus upon each full turn of shaft —21, lever —90 is reciprocated a full stroke, and the work spindle, through the connections described, is rotated to the extent approximately of one tooth of the master gear, —operation of the work spindle taking place, as stated, during the inteval the master rack is disengaged from the master gear, the exact alignment of the work spindle being effected by re-engagement of the master rack with the master gear.

*Cross-stepping the work.*

Cross-stepping the work to cause the gears being ground to pass through full mesh with the grinding disc is accomplished by means of cross-feed mechanism consisting of a rack —94 mounted on bed plate —51ª, a gear —95 on a shaft —96, mounted on the bed plate to mesh with the rack and enclosed in a gear case —97, a disc —98 on shaft —96, a hand lever —99 freely mounted on the hub of disc —98 and having a friction pawl —100 pivoted thereon and adapted to have operative engagement with disc —98 in one direction and idle relation therewith in the opposite direction; a bell crank lever —101 pivoted on the work head bracket as at —102 one arm of which is connected to pawl —100 by a link —103, the opposite arm of lever —101 having a roller —104 adapted to contact with the cam —105 formed on collar —57 on work spindle —54. Thus upon each full turn of the work spindle the cross-feed mechanism, as here described, will be actuated to move the work head transversely of the machine one step, thus acting accordingly to advance the gears being ground, through mesh with the grinding disc and effecting the grinding operation over the surface of the gear teeth. An adjusting screw —103ª is provided on link —103 to regulate the extent of movement imparted to gear —95 on each step of the cross-feed operation.

Provision is made for manually disengaging the cross-feed mechanism by moving hand lever —99 inwardly to release the friction contact of pawl —100 on disc —98. Release of the mechanism permits manual operation of the indexing mechanism of the work spindle by means of hand lever —99ª secured to shaft —96, thus the machine can readily be manipulated for setting up work to be ground, etc.

The cross-feed mechanism is also provided with automatic stop mechanism which acts to disengage the clutch mechanism on shafts —20 and —21 and to stop the cross-feed movement as determined by the adjustments of the machine. Control of the clutch is effected by means of the clutch lever —24ᶜ which has an L-shaped beveled end, or foot —24ᵈ, adapted to be moved into the annular groove —22ª of clutch member —22 in position to be engaged as the clutch rotates by the groove —24ᵇ of clutch pin —24 with the result that pin —24 will be moved longitudinally to the extent required to disengage clutch member —23, thus breaking the driving relation between shafts —20 and —21 and stopping the cross-feed and indexing movements.

Clutch lever —24ᶜ is connected to a hand lever —106 as at —107, lever —106 being pivoted on the frame of the machine as at —108 and is connected to a spring —109 which acts upon release of the lever to move the lever inwardly, and clutch lever —24ᶜ longitudinally as described, to effect disengagement of the clutch. A tripping lever —110 is pivoted on the machine frame as at —111 and has an arm extending upwardly into the path of a lug —112 which is adjustably mounted in a slot —113 in bed plate —51ª, being thus adapted for adjustment to limit the cross-feed movement of the machine according to the work to be ground. Lever —110 has a foot —114 which is adapted to engage lever —106 and lock it in its outer position thus acting to hold clutch lever —24ᶜ out of engagement with clutch member —22 until the work-head approaches the limit of the cross-feed movement when lever —110 will be tripped by contact of lug —112 which will release lever —106 and move lever —24ᶜ by action of spring —109 in position to disengage the clutch and stop the cross-feed movement of the work head, and also the indexing movement of the work spindle. Lever —110 is provided with a finger piece —110ª for manually raising the lever and releasing lever —106 to afford full manual control of the machine by the operator.

The cross-feed control mechanism is connected to the main driving mechanism of the machine by a shaft —115 mounted in brackets —116 on the side of the machine, shaft —115 having an arm —117 which has free contact with lever —106 on the inner side thereof, and an arm —118 at its opposite end which is adapted to have latching engagement with the main control lever —119 of the machine, lever —119 being connected to clutch —9 of drive shaft —5 by means of a shaft —120 mounted in brackets —121 on base B of the machine. A spring —122 coiled around shaft —120 acts to hold the clutch mechanism of shaft —5 normally disengaged, the driving mechanism being rendered operative by movement of control lever —119 into catching engagement with arm —118. Lever —106 is then operated manually into locking engagement with lever —110 thus acting to start the machine in full operation. When lever —106 is disengaged, the ram of the machine can be set in operation by operation of lever —119 without operation of the cross feed mechanism, such provision being made to effect convenient control of the different units of the machine in setting up work thereon and for adjustment of the movement of one unit relative to another.

*Grinder disc dresser.*

The grinder disc dresser, here shown in combination as a feature of the integral gear grinding machine, may be of any suitable construction to effect dressing of the work edge of the grinder disc to the exact conformation of a tooth of a master rack, agreeing as to specifications with the teeth of the gears to be ground.

As here shown in a preferred form, the disc dressing device consists of a cylindrical post —125 which is mounted on machine base —B directly under the grinder disc —34. Arranged telescopically of post —125 is a sleeve or housing —126 which is axially adjusted relative to the sleeve by means of a vertically extended slot in post —125, and a key —127 secured in the sleeve by screws —128ª and projecting into the slot, thus serving to prevent rotatable movement and providing for longitudinal adjustment of sleeve —126 relative to post —125. Opposite slot —127 a bracket —128 is secured to sleeve —126 and is connected to the base of post —125 by an adjusting screw —129 by means of which the sleeve can be closely adjusted vertically.

A post —130 having a head —131 is secured to sleeve —126 by means of a dust cap —132, and extends through post —125 thus forming a long bearing support for the disc dressing mechanism which is mounted on the head of the post, further provision for the exclusion of dust or grit from the bearing being made by means of an annular tongue and groove —133 interposed between the dust cap and sleeve —126.

The disc dresser mechanism, as here shown, consists of a column —134 mounted on the head of post —130 and having ways —135 for a slide —136 in which suitable disc dressing devices, as diamonds —137 and —138, are mounted, diamond —137 being mounted to dress the angular work surfaces of the disc on both sides thereof and diamond —138 to dress the peripheral edge of the disc, thus providing for dressing the disc to the exact requirements of the gears to be ground. Slide —136 is operated in the ways —135 by means of toggle levers —139 which are connected thereto and to a crank shaft —140 mounted in suitable bearings on post —130. The diamonds —137 and —138 are adjustable longitudinally of their mountings by means of an adjusting screw —141, thus the dressing device is readily adaptable to dress grinder discs of different diameters and for variable specifications of gears to be ground.

From the foregoing detailed description the construction operation and practice of my invention generally will be readily understood by those experienced in this art. It will be seen that my improved machine is readily adaptable to grinding gears having a wide range of specifications, that great accuracy and uniformity in the work will be realized with accurate construction and proper maintenance of the machine, and that the grinder is in all respects adapted for rapid and sustained production.

Having described my invention, I claim:

1. In a gear grinding machine, the combination of a grinding wheel, means for supporting work to be ground at right angles to said grinding wheel, a master gear on said supporting means, and means for aligning the work with said master gear, comprising an angularly and longitudinally adjustable rack bar mounted in predetermined relation relative to the master gear and adapted to be moved into relation with said work to align the same with the master gear.

2. In a gear grinding machine, the combination of a grinding wheel, means for supporting work to be ground at right angles to said grinding wheel, a master gear on said supporting means, means for aligning the work with said master gear, comprising a pivotally and longitudinally adjustable rack bar mounted in predetermined relation relative to the master gear and adapted to be adjusted relative to said work to align the same with the master gear, and means to secure said aligning means in selective positions of said angular adjustments.

3. In a gear grinding machine, the combination of a grinding wheel, means for supporting and aligning work at right angles relative to said wheel, means for causing reciprocatory movement of the grinding wheel, relative to said work, means for causing rotary and lateral movement of the work relative to said wheel, and means comprising an automatically and manually operable clutch for controlling said rotary and lateral movements independently of the means for causing said reciprocatory movement.

4. In a gear grinding machine, the combination of a grinding wheel, means comprising a work spindle, a master gear on said spindle and a master rack cooperating with said master gear for supporting and aligning work relative to said wheel, means for causing reciprocatory movement of the grinding wheel relative to said work and means comprising a friction-drive actuating device on the work spindle for causing rotary movement of the work relative to said wheel.

5. In a gear grinding machine, the combination of a grinding wheel, means comprising a work-head, and spindle, a master gear on said spindle and a master rack cooperating with said spindle for supporting and aligning work relative to said wheel, means for causing reciprocatory movement of the grinding wheel relative to the work head, and means comprising a reciprocally operable frame for moving the master rack into and out of operative engagement with the master gear, and a friction-drive actuating device on the work spindle for causing step by step rotary movement of the work relative to said wheel.

6. In a gear grinding machine, the combination of a grinding wheel, means comprising a work head and spindle, a master gear on said spindle and a master rack cooperating with said spindle for supporting and aligning work relative to said wheel, means for causing reciprocatory movement of the grinding wheel relative to the work head, means for causing rotary movement of the work relative to said wheel, and means comprising a rack and gear of the work head, a cam on the work spindle, reciprocatory mechanism actuated by the cam and a friction-drive mechanism actuated by said reciprocatory mechanism and cooperating with said rack and gear for moving the work head step by step laterally of said machine.

7. In a gear grinding machine, the combination of a grinding wheel, means for supporting and aligning work relative to said wheel, and a drive shaft for causing reciprocatory movement of said wheel relative to said work, means comprising a plurality of cams on the drive shaft and a friction-drive mechanism operatively connected to each cam and to the work supporting means whereby upon operation of the shaft rotary and lateral movements, respectively, are imparted to said work.

8. In a gear grinding machine, the combination of a grinding wheel, means for supporting and aligning work relative to said wheel, and a drive shaft for causing reciprocatory movement of said wheel relative to said work, means comprising a plurality of cams on the drive shaft and a friction-drive mechanism operatively connected to each cam and to the work supporting means whereby upon operation of the shaft rotary and lateral movements, respectively, are imparted to said work, and manually operable means for effecting said rotary and lateral movements.

9. In a gear grinding machine, the combination of a grinding wheel, a work head for supporting gears to be ground relative to said wheel, a drive shaft for causing reciprocatory movement of said wheel relative to the work, means comprising step by step cross-feed mechanism for moving the work laterally of said wheel, means comprising a clutch on said drive shaft, controlling mechanism for the clutch and means carried by the work head for actuating said mechanism whereby said clutch is automatically disengaged and the cross-feed mechanism rendered inoperative at a given point of said cross-feed movement.

10. In a gear grinding machine, the combination of a grinding wheel, a work head for supporting gears to be ground relative to said wheel, a main drive shaft for said machine, and a drive shaft for imparting step by step cross-feed movement of the work head on said machine, means comprising a clutch on each of said drive shafts, controlling mechanism for the clutches, and means carried by the work head for actuating said controlling mechanism whereby said clutches and said shafts are automatically rendered inoperative at a predetermined point in said cross-feed operation.

11. In a gear grinding machine, the combination of a grinding wheel, a work head for supporting gears to be ground relative to said wheel, a main drive shaft for said machine, and a drive shaft for imparting step by step cross-feed movement of the work head on said machine, means comprising a clutch on each of said drive shafts, controlling mechanism for the clutches, and means carried by the work head for actuating said controlling mechanism whereby said clutches and said shafts are automatically rendered inoperative at a predetermined point in the operation of said machine, and means whereby said clutch controlling mechanism can be operated manually to render said clutches and said shafts inoperative.

12. In a gear grinding machine, the combination of a grinding wheel, means for supporting the work to be ground, means for aligning the work longitudinally and rotatably relative to said wheel, said aligning means comprising a longitudinally operable member adapted to be moved radially of the work supporting means into engagement with the work to adjust the same rotatably relative to the master gear, and a master rack having a tooth in accurate longitudinal alignment with the grinding wheel and adapted to mesh with the master gear to align the same and said work rotatably relative to said wheel.

In testimony whereof, I affix my signature.

ORLANDO GARRISON.